June 24, 1958 — E. J. HERBENAR — 2,840,316
CLUTCH DRIVE UNIT AND CONTROL SYSTEM
Filed March 5, 1956 — 3 Sheets-Sheet 1
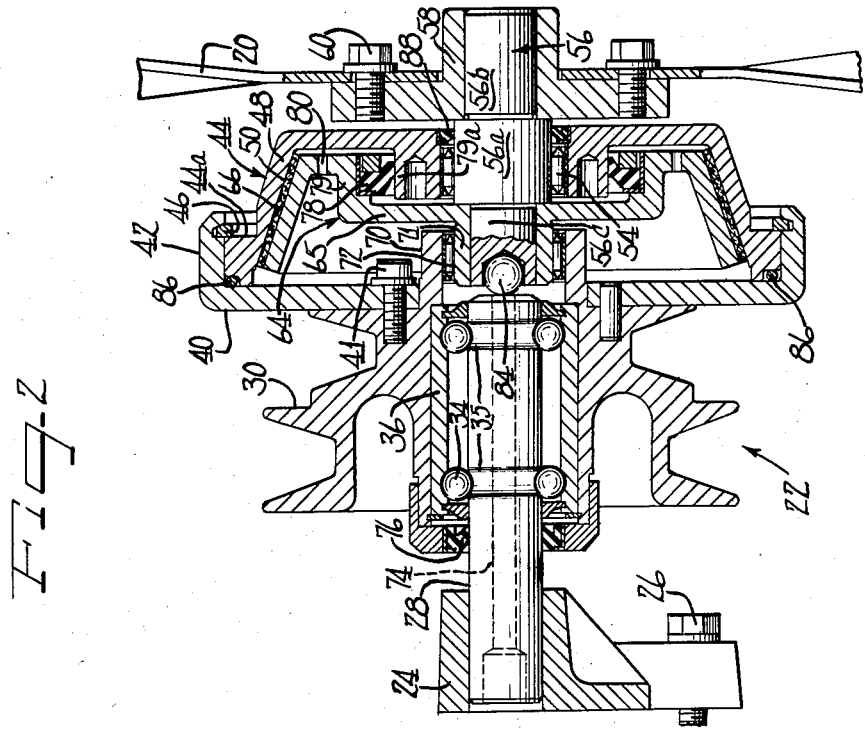
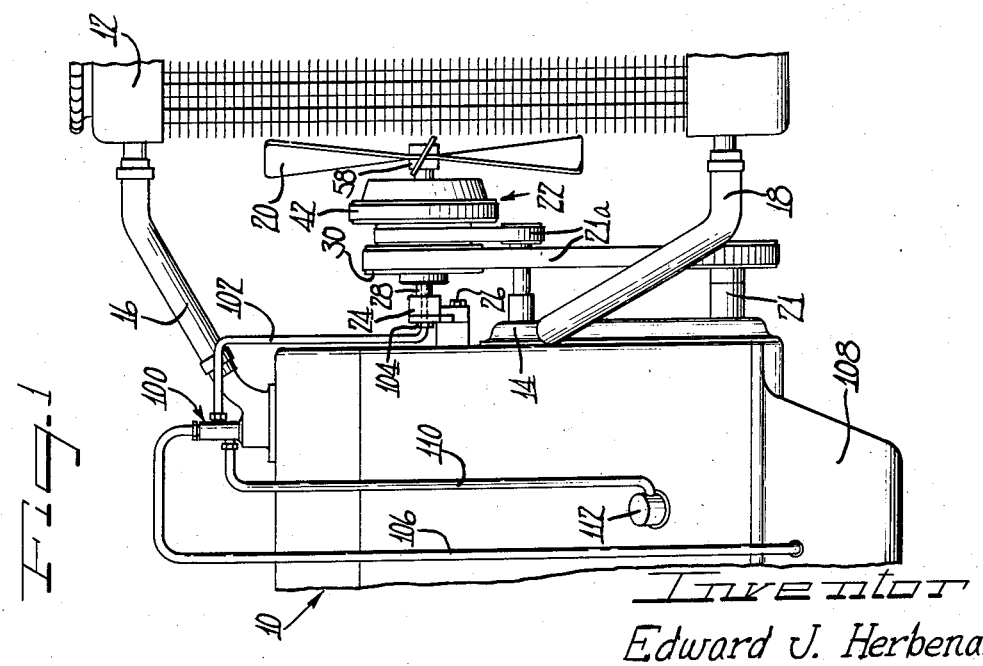
Inventor
Edward J. Herbenar June 24, 1958 — E. J. HERBENAR — 2,840,316
CLUTCH DRIVE UNIT AND CONTROL SYSTEM
Filed March 5, 1956 — 3 Sheets-Sheet 2

Inventor
Edward J. Herbenar

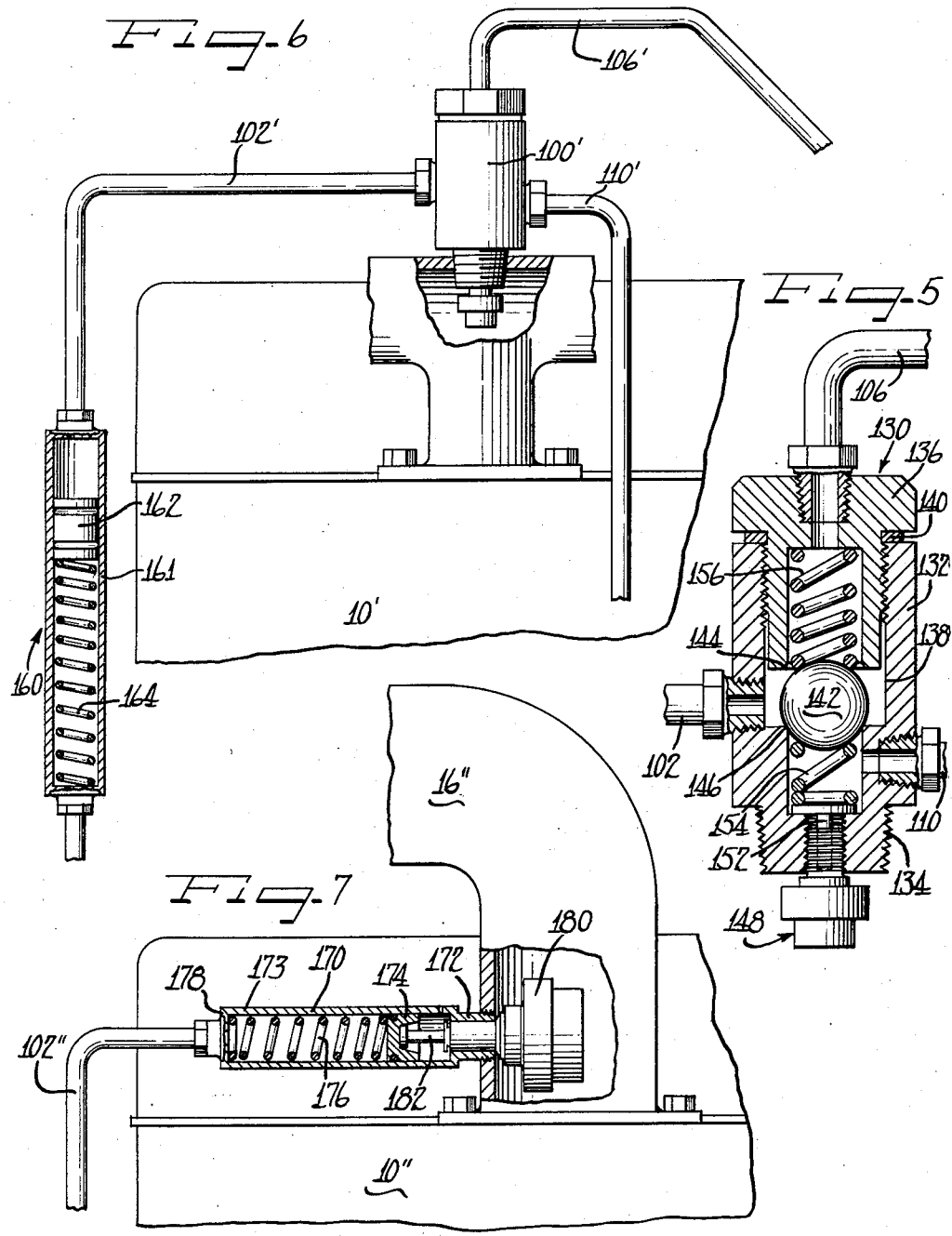

United States Patent Office 2,840,316
Patented June 24, 1958

2,840,316

CLUTCH DRIVE UNIT AND CONTROL SYSTEM

Edward J. Herbenar, Detroit, Mich., assignor to Thompson Products, Inc., Cleveland, Ohio, a corporation of Ohio Application March 5, 1956, Serial No. 569,492

10 Claims. (Cl. 236—35)

This invention relates to improvements in means and systems providing selectively engageable drive means, such as for the fan of an internal combustion engine. More particularly, the present invention pertains to a novel type automotive cooling fan in which a clutchable drive and drive-control arrangement delivers fan-driving torque through a wet friction cone clutch, although other uses will be apparent.

It has been found for more optimum operation of an internal combustion engine, that it is sometimes of advantage that the fan thereof be disconnected from its power source. For example, during periods of starting and engine warm-up, especially in cold weather, it is desirable that heat developed by the firing of the engine be not dissipated by any unnecessary flow of air past the radiator and engine. Moreover, during some driving conditions, such as fairly high speed and/or low temperature, sufficient cooling is obtained by the sweep of the radiator relatively against the air, as caused by the movement of the vehicle; hence the power used to turn the fan during such conditions is unnecessary and wasteful.

It is accordingly an object of the present invention to provide a new and improved means and system for driving a fan of an internal combustion engine.

It is another object to provide a novel fan-drive construction in which a fan is adapted to be selectively engaged and disengaged from a drive source.

A further object is to provide an economical and simplified construction for effecting driving connection of a fan unit in response to predetermined conditions of actuation.

Another object is to provide an effective fan drive unit employing engageable-disengageable clutch means actuatable in response to predetermined conditions of temperature of the engine coolant fluid.

Another object is to provide such a drive system which is dependent only upon temperature of engine coolant and wholly independent of the engine oil system.

These and other objects, features, and advantages of the present invention will be readily apparent from the following description of illustrative embodiments thereof, taken in conjunction with the accompanying drawings, in which:

Figure 1 is a fragmentary side elevational view of an engine provided with a cooling fan drive unit according to the principles of the present invention, in one embodiment thereof;

Figure 2 is an enlarged longitudinal and vertical sectional view of the fan drive unit shown in Figure 1, parts being shown broken away for clarity of presentation, the device being shown in the condition in which the clutch is engaged to effect a driving of the fan;

Figure 5 is a sectional view generally similar to Figure 4, but showing an alternative control element;

Figure 6 is an enlarged fragmental view of a portion of the control system according to an embodiment wherein an auxiliary cylinder is provided in the control line to the drive unit; and Figure 7 is a sectional view showing control means according to still another embodiment of the present invention.

Figure 3:
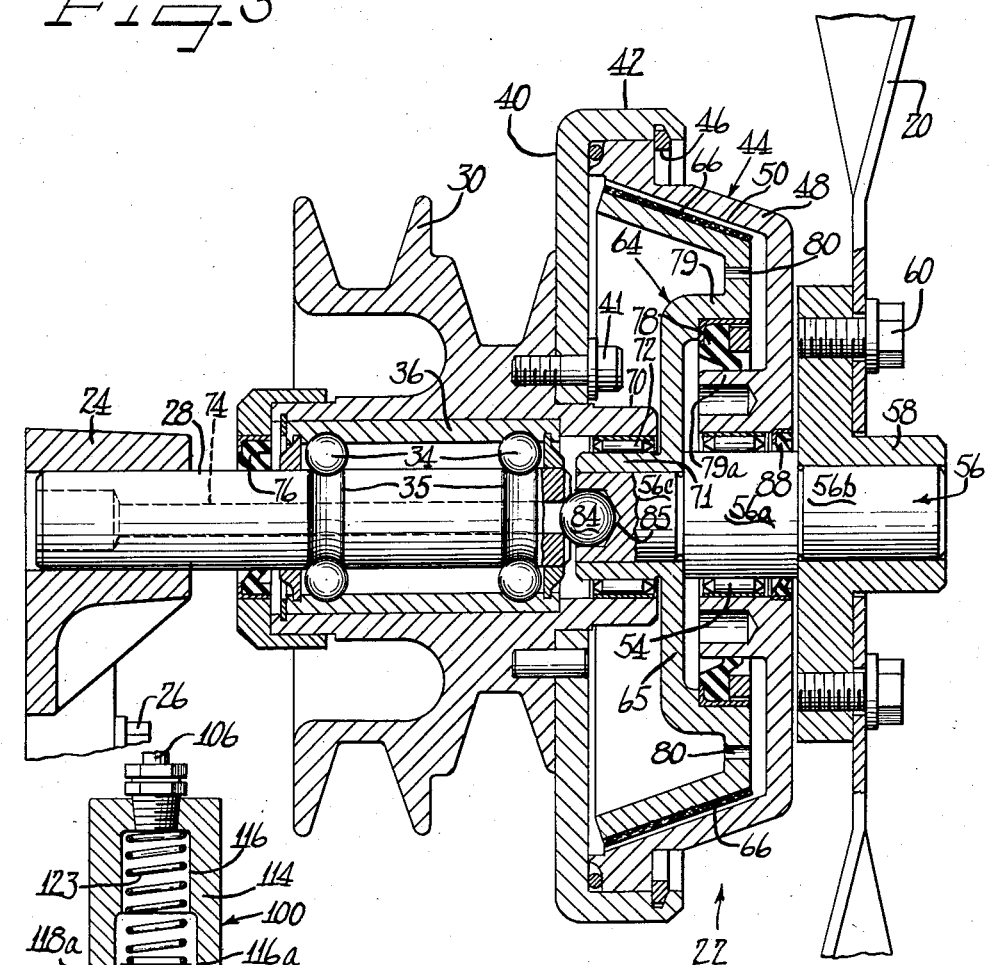
Figure 3 is a longitudinal, vertical sectional view similar to Figure 2, but with the parts being shown in a clutch-disengaged condition.

By way of example, there is shown in Figure 1 a liquid cooled internal combustion engine 10 having a radiator 12. The coolant for the engine 10 is circulated as by a coolant pump 14 from the engine 10 through an upper coolant line 16, through the radiator 12 and through a lower coolant line 18 connected to the lower end of the radiator 12. A fan 20 is provided to draw air past the radiator 12 to cool the coolant therein.

For driving the coolant pump 14 and fan 20, power is obtained from a main drive shaft 21 projecting forwardly from the engine 10, the power being transmitted through suitable belting 21a.

According to the present invention, novel means provide a selectively operable engageable-disengageable drive for the fan 20. As is best illustrated in Figures 2 and 3, this arrangement comprises a clutch drive unit 22. In Figure 2, the parts are shown in their clutched position for effecting driving relation of the fan, while in Figure 3 the parts are shown in their non-clutched relation in which the fan 20 is not driven.

The drive unit 22 is shown supported on the engine 10 by a mounting bracket member 24 held as by bolt 26 to the engine casing.

The mounting bracket 24 carries a forwardly extending fixed shaft 28 upon which is rotatably mounted a pulley 30. To provide for free rotation of the pulley 30 about the fixed shaft 28, a bearing is provided as shown by bearing balls 34. The balls ride in race-ways 35 provided as circumferential grooves in shaft 28, and within a sleeve 36 fixed to the pulley 30.

Adjacent the forward end of pulley 30 is carried a radially outwardly extending flange member 40, the flange member 40 being fixedly connected to pulley 30 as by bolts 41. The outer margin of the flange member 40 is shown as turned forwardly to provide a forwardly extending annular flange 42.

A housing or like member 44 is shown as carried by the annular flange 42 to provide one of the engageable faces of the clutch unit. As shown, for holding the housing member 44 fixed to the flange member 40, the annular flange 42 of the latter member is formed near its forward end with an annular groove adapted to receive a locking member such as a split ring 46 shown. The arrangement shown is such that with the housing 44 seated against flange member 40 the split ring 46 abuts a forwardly facing marginal shoulder 44a of housing 44 to hold it tightly fixed to flange member 40.

The housing member 44 in the embodiment shown integrally provides one of the clutch-operable faces. Accordingly it is formed to possess a rearwardly-opening conical portion 48, the rearward surface 50 of which is adapted to be clutchingly engaged by an associated clutch element shortly to be described.

The central portion of the housing 44 is shown as provided with a bearing means 54 adapted to rotatably receive an intermediate portion 56a of a fan drive shaft 56. A forward portion 56b of shaft 56 extends forwardly of the housing 44 and non-rotatably carries a fan hub 58 to which the fan 20 is fixedly connected as by bolts 60.

A rearwardly extending, reduced diameter portion 56c of the fan drive shaft 56 projects rearwardly of the housing bearing 54. To this rearward shaft-extension 56c is fixedly connected, as by a press-fit relationship, a clutch member 64. The clutch member 64 as shown comprises a radially extending portion 65 which carries a ring-like clutch face 66 of a configuration to be clutchingly engageable with the clutch surface 50 provided by the housing 44.

For rotatably supporting the rear fan-shaft extension 56c and the clutch member 64, the pulley 30 is provided with a forwardly extending sleeve-like portion 70 spacedly and concentrically overlying an annular hub or sleeve-like portion 71 rearwardly extending from the clutch member 64, and an annular bearing 72 is disposed between the juxtaposed surfaces of the clutch member-portion 71 and the pulley-extension 70.

In brief summary of the structure of the fan drive unit of Figures 2 and 3 as so far described, it will be observed that the shaft 28 is fixed with respect to the engine 10, and that the pulley 30 is rotatably received on the shaft 28. Flange member 40 and housing 44 are both fixed to the pulley 30, and are hence co-rotatable therewith. The fan 20, fan shaft 56, and clutch member 64 are fixed relative to one another, in an assembly rotatable with respect to the housing 44.

It will be observed that the clutching engagement of the clutch member 64 and the housing member 44 depends on their relative axial relationship. Axial shifting, relative to the housing 44, of the assembly of clutch member 64, fan shaft 56, and fan 20 is accommodated by the bearings 72 and 54. Accordingly, with the assembly of clutch member 64, fan shaft 56, and fan 20 moved rearwardly with respect to housing member 44, as in Figure 3, the clutch faces 66—50 are out of engagement and torque is not being supplied to the fan; however when the assembly of clutch member 64, fan shaft 56, and fan 20 is moved forwardly with respect to housing member 44, as in Figure 2, clutch faces 66—50 are in engagement to drive the fan.

The means shown for selectively shifting and controlling the relative axial relationship of the clutch member 64 and the housing member 44, to selectively engage or disengage the drive to the fan 20, will now be described.

As shown, the shaft 28 is provided with a hollow bore 74 extending throughout the length of the shaft 28 and emerging at the front face thereof. Through this bore 74 of shaft 28, control fluid is thus adapted to be supplied from an associated source to the rear of the clutch member 64, the bearing 72 being of an open type permitting the control fluid to work its way therethrough to exert pressure on clutch member. An annular seal ring 76 is carried at the rear of pulley 30 and provides a rotary seal against shaft 28 to prevent the control fluid from moving rearwardly along the shaft 28 from the clutch device.

The control fluid under pressure thus supplied to the rear surface of the clutch member 64 forces the clutch face 66 into clutching engagement with the mating clutch surface 50 of the housing member 44, thus holding the pulley 30 and fan 20 together for joint movement driving the fan.

It should be noted that as shown, the pressure of the control fluid is applied not only to the rear of the clutch element 64, but also to radially outward portions of the forward surface thereof, thus keeping the clutch disk 66 wet with control fluid and permitting it to serve as a wet type friction cone clutch.

Pressure of the control fluid is prevented from acting along the full forward face of the clutch element 64 by an annular seal member 78. This seal 78 is sealingly disposed between juxtaposed surfaces of the clutch member 64 and the housing 44, those surfaces shown as provided by a relatively large diameter hub-like portion 79 of clutch member 64 and a relatively small diameter portion 79a of housing 44. The seal member 78 sealingly accommodates the relatively slight axial shifting of the clutch member 64 and housing member 44 incident to clutch control. Since seal 78 is disposed at a distance radially outward along the clutch member 64, it prevents the pressure of the control fluid from acting against the entire forward face of clutch member 64. Hence the greater effective area of the rear surface of clutch member 64 results in a force differential, and the force exerted by the pressure of the control fluid on the rear of clutch member 64 is effective to cause the clutch member 64 to move to and to be maintained in its forward position in which the clutch drive is engaged. Bleed ports 80 extend through the clutch member 64 to permit control fluid to pass thereacross, assisting in wetting the clutch faces and providing for pressure venting from forwardly of the clutch member 64 as it is shifted forwardly to engage the mating clutch surface.

If pressure of the control fluid is released, air striking the fan blades of fan 20 urges it to move rearwardly. This shifts the clutch member 64 rearwardly with respect to the housing member 44, effecting a disengagement of the clutch members 66—50 to remove the driving force of the fan 20. The bearings 72 and 54 permit the relative rotation of pulley 30 with its housing member 44 with respect to the fan shaft 56 and its clutch member 64.

Rearward movement of the fan 20 is arrested by thrust means shown as comprising a ball member 84 carried in a recess 85 at the rear end of shaft portion 56c of the fan shaft, the ball being engageable with the forward end face of the fixed shaft 28.

Additional or auxiliary sealing means are shown. These include an annular sealing ring 86 between the outer marginal portion housing member 44 and a juxtaposed surface of the flange member 40. Also, an annular seal member 88 is shown as provided forwardly of the bearing 54, providing a seal between the fan shaft portion 56a and the housing member 44 but permitting both relative rotation and relative axial movement thereof.

From the description of the present invention as so far explained, it will be observed that the fan 20 is drivingly connected to the pulley wheel 30 in response to pressure of control fluid supplied to the bore 74 of the fixed shaft 28, but that upon release of pressure of control fluid in the shaft bore 74 continued rotation of the pulley wheel 30 is ineffective to rotate the fan 20.

For controlling the pressure of control fluid to effect such desired engagement and non-engagement of the drive unit for the fan 20, several embodiments of control means and systems are illustrated in the drawings.

In Fig. 1 is shown an apparatus wherein actuation of the fan 20 is responsive to the temperature of the coolant fluid. In this arrangement, the fan 20 will not be driven until the temperature of the coolant fluid has reached a predetermined minimum, permitting faster engine warm-up. Moreover, if the temperature of the coolant fluid should fall below that predetermined minimum, the drive of the fan 20 will be disengaged, avoiding the use of power for driving the fan.

Accordingly, in Fig. 1, the engine is shown as provided with a control device indicated generally by reference numeral 100. A conduit line 102 leads from control device 100 to a fitting 104 in communication with the bore 74 of fixed shaft 28. Such line 102 thereby serves as a load and unload line controlling pressure of the control fluid to the clutch device.

A low-pressure line 106 connects the control device 100 with a low pressure source such as the engine sump 108, and a high pressure conduit line 110 connects the control device 100 with a source of high pressure such as the engine oil pump 112. As will now be described the control device 100 is adapted to admit or release pressure to the conduit line 102 in response to temperature of the coolant fluid.

Figure 4:
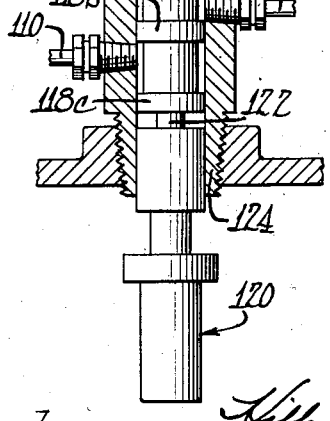
Figure 4 is an enlarged sectional view of a control element for the apparatus shown in Figure 1.

As illustrated in the enlarged cross-sectional view of Figure 4, the control device 100 comprises a generally cylindrical casing 114 provided with an axial bore 116 in which is slidably disposed a spool-type valve member 118. A temperature-responsive element 120 is carried by and fixed to the control member casing, and has a plunger 122 which is adapted to actuate the spool 118 for movement along bore 116. A spring 123 is disposed in bore 116 above the spool 118 to bias the spool towards a lowered position as shown in Figure 4.

The lower end of the casing 114 is tapered and threaded as at 124 to be received in sealing engagement by a tapered tap of the engine 10 in an area where the coolant fluid passes into the coolant line 16 in its circulation to the vehicle radiator 12. To relatively position the temperature-responsive element 120 with the casing 114, an enlarged cylindrical portion of the element 120 is received in press fit relationship at the lower end of the casing, with the plunger 122 extending inwardly into the bore 116 of the casing.

The temperature-responsive element shown is commonly referred to as a "Vernay," "Vernet," or "Vernatherm element," and is desirably of the general type shown as described in the Vernet Patent No. 2,368,181, issued January 30, 1945. The particular utility of this type of temperature-responsive element is in the positive action of the plunger, which provides more power than other thermostatic elements and a relative long piston travel, together with a compact overall size of the element in comparison with other known thermostatic units. It is thus particularly desirable for use in the present invention, although other thermostatic units may be employed. In such a unit, there is desirably provided thermally expansible material of the type shown and described in Vernet Patent No. 2,259,846, issued October 21, 1941. It will be understood that upon rise of the element to a predetermined temperature the thermally expansible material acts against a membrane or deformable member (not shown) to extend the plunger 122.

It will be observed that the spool 118 is provided with a plurality of lands or large-diameter portions 188a, 118b, and 118c, of a diameter to be snugly received within the casing bore 116. It will be further observed that in the region of the upper land 118a, the bore is enlarged as at 116a to accommodate communication of fluid around the land 118a except when the spool 118 is in a highly raised position.

In operation of the control device shown in Figure 4, when the engine coolant temperature is below a predetermined value, the position of the control valve will be such as is shown in Figure 4. That is, the high pressure line 110 is out of communication with the load-unload conduit 102 because of the presence of the spool land 118b. Moreover, that load-unload line 102 is in communication with the low pressure line 106 around the land 118a. Accordingly any pressure of the fan drive unit is released. Consequently the fan drive clutch is disengaged, as above described.

Temperature rise of the coolant fluid will be sensed by the temperature-responsive element 120, to move the plunger 122 and spool 118 upwardly against the bias of spring 123.

This upward movement of spool 118 causes the land 118b thereof to move upwardly to permit communication of pressure in the high-pressure conduit 110 with the load-unload conduit 102. Moreover, the land 118b will block communication from the load-unload conduit 102 to the low-pressure line 106. Thus, pressure is communicated to the fan clutch 22 to actuate the fan.

Hence, depending upon the temperature of the coolant fluid, actuation of the temperature-responsive element 120 and the axial movement of the spool 118 will result accordingly to vary the amount of communication between the high-pressure line 110 and the load-unload conduit 102 and vary the pressure thereby supplied to the clutch element 64 of the fan drive unit.

Figure 5 illustrates a control device according to another embodiment of the present invention. As there shown, and generally designated by reference numeral 130, the control device comprises a generally cylindrical hollow casing 132 the lower end 134 of which is tapered and threaded to be received in sealing engagement by a tapered tap of the engine at a location to sense coolant fluid temperature, similarly to that of the embodiment described above.

Likewise in accordance with the embodiment previously described, the control device 130 of Figure 5 is fitted with a load-unload conduit 102 leading to the fan clutch unit, a low pressure conduit 106 leading to a low pressure source such as the sump of the engine, and a high pressure conduit 110 leading to a high pressure source such as the oil pump of the engine. As shown, the upper portion of the casing 132 is internally threaded to receive a plug-like end-closing means such as plug 136. The plug 136 is shown as provided with external threads adapted to mate with internal threads provided in the bore 138 of the casing 132. Suitable sealing means 140 are disposed between a flange portion of plug 136 and the end face of the casing 132, to seal the plug to the casing.

A valve member such as a ball 142 is disposed within the bore 138, and as will now be described, the ball 142 is adapted in response to temperature to selectively communicate the load-unload line 102 with the high pressure line 110 and the low pressure line 106, respectively.

Within the bore 138, the ball 142 is axially movable between a pair of opposed valve seats, one valve seat 144 being shown as provided at the inward end of the plug 136, and a second valve seat 146 being shown as provided by a shoulder inwardly extending from the casing 132. The spacing of the valve seats 144 and 146 is sufficiently great with respect to the diameter of the ball 142 that with the ball 142 seated upon either of the valve seats 144 or 146 the ball is not seated against the other valve seat.

In the arrangement shown, the load-unload line 102 communicates with the bore 138 of the control device 130 in a location between the valve seats 144 and 146. Moreover, it will be observed that the low pressure line 106 communicates with the control device in a location outwardly of valve seat 144, and more specifically, as shown, the low pressure line 106 communicates with the device 130 via a port in the plug 136. It will be further observed that the high-pressure line 110 communicates with the casing 132 at a location outwardly of valve seat 146, that is, remote from the communication location of the low pressure line 106.

Temperature-responsive means, such as the "Vernet" element 148 are provided to actuate the valve ball 142. As shown, the Vernet element 148 is threaded into the lower end of the casing 132, and provides a plunger or piston 152 which is extendable in response to temperature. The plunger 152, through an overtravel spring 154, acts against the valve ball 142 to urge the same upwardly against the valve seat 144 and against the bias of a return spring 156 shown disposed in an axial bore of the plug 136.

Accordingly, when the temperature of the coolant fluid has reached a predetermined minimum, extension of the thermal element plunger 152 is effective to seat the valve ball 142 upon valve seat 144, thus communicating the high pressure line 110 with the load-unload line 102. Thus pressure is accordingly effected to clutch the fan into driven relation with the fan driving means, as discussed above.

However, when the temperature of the coolant fluid being sensed has dropped below that predetermined minimum value, retraction of plunger 152 and bias of return spring 156 seat the valve ball 142 on the valve seat 146, thus blocking pressure to the load-unload line 102 from high pressure line 110 and opening communication from the load-unload line 102 across valve seat 144 to the low pressure line 106. This permits a release of the pressure in the load-unload line 102, and accordingly as has been described above the clutch drive for the fan will then be disengaged.

It will thus be observed that the control devices 100 and 130 of Figures 4 and 5, respectively, provide automatic control of the vehicle fan in response to the temperature of the coolant fluid of the engine. At temperatures below the temperature at which it is desired that the engine fan be actuated, each of the control devices permits a release of pressure of control fluid in the load-unload line 102. When the coolant temperature rises to the predetermined minimum, the control elements operate to apply pressure to the load-unload line 102 to cause the clutch unit 22 to energize the fan 20.

The control devices 100 and 130 as illustrated, may utilize engine oil pressure as a high pressure source adapted to actuate the fan clutch drive unit, and utilize engine oil as the control fluid for the fan clutch unit.

In Figure 6, however, there is illustrated a system permitting the possibility of using fluid other than engine oil in the fan clutch drive unit. There is shown an engine 10' having a temperature responsive control element 100' located to sense the temperature of coolant fluid. It will of course be understood that other control elements, such as described above may be employed. As shown, there is a high pressure conduit 110' and a low pressure conduit 106' connected to the control element 100' as above described. Here, however, the load-unload line 102' is provided with fluid separating and pressure transmitting means indicated generally by reference numeral 160. Such means as shown comprises a cylinder 161 within which is slidably disposed a piston 162. A spring 164 is shown as disposed within the cylinder 161 to bias the piston 162 away from the clutch drive unit, thus biasing against high pressure and accordingly biasing the clutch into dis-engaged condition.

In the embodiment thus illustrated in Figure 6, it will accordingly be observed that the displaceable piston member 162 separates the control fluid which circulates through the control element 100 from the control fluid which circulates in the associated fan clutch unit. Accordingly, engine oil may be utilized to supply the desired variations of pressure to control the fan clutch actuation while a fluid other than the engine oil may be used in the fluid coupling.

Figure 7 illustrates a control system independent of the engine oil or lubrication system. As there shown, in association with a coolant fluid line 16" leading from an engine 10", there is provided a pressure control device including a displacement means actuated by the extendible member of a temperature-responsive device. Thus it provides a direct type pressure actuation of the fan clutch unit in response to temperature, rather than an indirect type actuation as in the embodiments previously described wherein the temperature-responsive element actuates a selector valve to admit pressure to the fan clutch unit from an auxiliary source.

The device of Figure 7 in the form illustrated includes a cylinder 170 one end 172 of which is shown as threaded into a wall of the coolant fluid conduit 16". The opposite end 173 of the cylinder 170 is connected as by load-unload line 102" to the clutch drive unit. A piston member 174 is slidably disposed in the bore of cylinder 170 for confined movement, and it will be seen that the position of piston 174 in cylinder 170 controls the pressure of control fluid in the cylinder and the load-unload line. To bias the piston 174 in a direction to relieve pressure in the clutch unit, a spring 176 is provided, and as shown is disposed within the bore of cylinder 170 between the piston 174 and an end wall 178 of the cylinder at the end 173.

For actuating piston 174, a temperature-responsive element 180 such as a Vernet type element shown is fixed with respect to the cylinder 170, as by a press-fit relationship therewith. The temperature-responsive element 180 is provided with a plunger 182, the arrangement being such that when the temperature of the coolant fluid reaches a predetermined minimum, the plunger 182 engages the piston 174 to exert pressure on control fluid in the load-unload line 102" and thus clutch in the fan.

When the temperature of the coolant fluid falls below that point, spring 176 biases the piston 174 to relieve the pressure of the control fluid, thus de-energizing the fan.

A fan drive unit and control system constructed according to the principles of the present invention thus provides an effective, controllable drive for an engine fan.

The driving actuation of the fan is made to occur in response to predetermined conditions, particularly of the temperature of the engine coolant fluid. The invention may or may not utilize pressure of the vehicle's oil or lubrication system.

It will thus be seen from the foregoing description of my invention according to illustrative embodiments thereof, considered in conjunction with the accompanying drawings, that the present invention provides a new and improved selectively engageable drive means and control system, having the desired advantages and characteristics, and accomplishing the intended objects, including those hereinbefore pointed out and others which are inherent in the invention as described.

It will be understood that modifications and variations may be effected without departing from the scope of the novel concepts of the present invention.

I claim as my invention:

1. A fluid-actuated cooling fan drive for an internal combustion engine, comprising a first rotatable means providing a first clutch member, a fan, a fan shaft carrying said fan, a second clutch member rigidly secured to said fan shaft, and spaced annular bearing means rotatably supporting said second clutch member and fan shaft from said rotatable means but permitting axial shifting of the fan shaft to effect engagement and disengagement of said first and second clutch members, and means for applying pressure fluid to effect engagement of the clutch members.

2. A fluid-actuated cooling fan drive for an internal combustion engine, comprising a first rotatable means including a drivable pulley having a member non-rotatably connected thereto and providing a first clutch member, a fan, a fan shaft carrying said fan, a second clutch member fixedly secured to said fan shaft, and annular bearing means supported by said pulley and supporting said second clutch member and fan shaft for rotation and reciprocation relative to said first clutch member.

3. A fluid-actuated cooling fan drive for an internal combustion engine, comprising a first rotatable means providing a first clutch member, a fan, a fan shaft carrying said fan, a second clutch member carried by said fan shaft and angularly fixed relative thereto, said second clutch member including a sleeve-like portion surrounding said fan shaft along a portion thereof remote from said fan and engaging a shoulder on said shaft for forcing said shaft forward when said second clutch member moves forward for engagement with said first clutch member, and annular bearing means supportingly disposed between said fan shaft and said rotatable means.

4. A fluid-actuated cooling fan drive for an internal combustion engine, comprising a first rotatable means including a drivable pulley, a radially extending flange member connected thereto and having a marginal portion providing an annular flange, and a housing structure held for co-rotation therewith, said housing structure providing a first clutch member fixedly, a fan and axially shiftable within said housing, a fan shaft fixedly carrying said fan, a second clutch member carried by said fan shaft within said housing and means for applying pressure fluid against said second clutch member to effect engagement of the clutch members by axial movement of said second clutch member.

5. A fluid-actuated cooling fan drive for an internal combustion engine, comprising a first rotatable means providing a first clutch member, a fan, a fan shaft carrying said fan, a second clutch member rigidly secured to said fan shaft, and spaced annular bearing means rotatably supporting said second clutch member and fan shaft from said rotatable means but permitting axial shifting of the fan shaft to effect engagement and disengagement of said first and second clutch members, and means for applying pressure fluid directly against said second clutch member to effect engagement of the clutch members.

6. In combination in a cooling system for engines, an engine fan, a fan shaft fixedly secured to said fan, a rotatable housing drivingly connected to said engine output shaft, bearing means in said housing for reciprocably and rotatably supporting said fan shaft coaxially with the housing, a friction clutch surface on an inside axially facing surface of said housing, a clutch member carried by said fan shaft within said housing for rotation with said fan shaft, a second friction clutch surface on said clutch member for axial cooperation with said first clutch member, said clutch member comprising a piston member reciprocable within said housing and means applying fluid force directly against said piston to engage said clutch surfaces to drive said fan with said housing.

7. In combination in a cooling system for engines, an engine fan, a fan shaft fixedly secured to said fan, a rotatable housing drivingly connected to said engine output shaft, bearing means in said housing for reciprocably and rotatably supporting said fan shaft coaxially with the housing, a friction clutch surface on an inside axially facing surface of said housing, a clutch member carried by said fan shaft within said housing for rotation with said fan shaft, a second friction clutch surface on said clutch member for axial cooperation with said first clutch member, said clutch member comprising a piston member reciprocable within said housing and means applying fluid force directly against said piston, said piston having a differential effective area on opposite sides thereof with a larger effective area on the side thereof opposite from said first friction clutch surface whereby the application of fluid pressure to said housing on both sides of said piston acts to engage said clutch surfaces to drive fan with said housing.

8. In combination in a cooling system for engines, an engine fan, a fan shaft fixedly secured to said fan, a rotatable housing drivingly connected to said engine output shaft, bearing means in said housing for reciprocably and rotatably supporting said fan shaft coaxially with the housing, a friction clutch surface on an inside axially facing surface of said housing, a clutch member carried by said fan shaft within said housing for rotation with said fan shaft, a second friction clutch surface on said clutch member for axial cooperation with said first clutch member, said clutch member comprising a piston having a larger effective face on the side thereof opposite said first friction surface, means applying fluid under pressure to the inside of said housing upon attainment of a predetermined engine temperature and an aperture in said piston permitting fluid trapped between said piston and said first clutch surface to vent to said opposite side of the piston whereby cushioned clutch engagement is achieved.

9. In combination in a cooling system for engines, an engine fan, a fan shaft fixedly secured to said fan, a rotatable housing drivingly connected to said engine output shaft, bearing means in said housing for reciprocably and rotatably supporting said fan shaft coaxially with the housing, a friction clutch surface on an inside axially facing surface of said housing, a clutch member carried by said fan shaft within said housing for rotation with said fan shaft, a second friction clutch surface on said clutch member for axial cooperation with said first clutch member, said clutch surfaces being conical, said clutch members comprising a piston having a larger effective face on the side thereof opposite said first friction surface, means applying a fluid under pressure to the inside of said housing upon attainment of a predetermined engine temperature and an aperture in said piston permitting fluid trapped between said piston and said first clutch surface to vent to said opposite side of the piston whereby cushioned clutch engagement is achieved.

10. In combination in a cooling system for engines, an engine fan, a fan shaft fixedly secured to said fan, a rotatable housing drivingly connected to said engine output shaft, bearing means in said housing for reciprocably and rotatably supporting said fan shaft coaxially with the housing, a friction clutch surface on an inside axially facing surface of said housing, a clutch member carried by said fan shaft within said housing for rotation with said fan shaft, a second friction clutch surface on said clutch member for axial cooperation with said first clutch member, said clutch member comprising a piston having a larger effective face on the side thereof opposite said first friction surface, means applying fluid under pressure to the inside of said housing upon attainment of a predetermined engine temperature and an aperture in said piston permitting fluid trapped between said piston and said first clutch surface to vent to said opposite side of the piston whereby cushioned clutch engagement is achieved, said first clutch surface facing in the direction of air movement through said fan whereby upon relief of fluid pressure in said housing air pressure on the fan will move said clutch surfaces apart to assure disengagement thereof.

References Cited in the file of this patent
UNITED STATES PATENTS

| | | |
|---|---|---|
| 2,047,028 | Metcalfe | July 7, 1936 |
| 2,330,024 | Beardsley | Sept. 21, 1943 |
| 2,376,939 | Ricart | May 29, 1945 |
| 2,637,308 | Dodge | May 5, 1953 |
| 2,661,148 | Englander | Dec. 1, 1953 |